United States Patent
Betz et al.

(10) Patent No.: US 7,302,569 B2
(45) Date of Patent: Nov. 27, 2007

(54) IMPLEMENTATION AND USE OF A PII DATA ACCESS CONTROL FACILITY EMPLOYING PERSONALLY IDENTIFYING INFORMATION LABELS AND PURPOSE SERVING FUNCTIONS SETS

(75) Inventors: Linda Betz, Poughkeepsie, NY (US); John C. Dayka, New Paltz, NY (US); Walter B. Farrell, Woodstock, NY (US); Richard H. Guski, Red Hook, NY (US); Guenter Karjoth, Waedenswil (CH); Mark A. Nelson, Poughkeepsie, NY (US); Birgit M. Pfitzmann, Sanstagern (CH); Matthias Schunter, Zurich (CH); Michael P. Waidner, Au-Wadenswil (CH)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 10/643,798

(22) Filed: Aug. 19, 2003

(65) Prior Publication Data
US 2005/0044409 A1   Feb. 24, 2005

(51) Int. Cl.
*H04L 29/00* (2006.01)
(52) U.S. Cl. .............................. 713/167; 726/27
(58) Field of Classification Search ............... 713/167
See application file for complete search history.

(56) References Cited

U.S. PATENT DOCUMENTS

| | | | | |
|---|---|---|---|---|
| 4,926,476 A | * | 5/1990 | Covey | 711/163 |
| 5,276,901 A | * | 1/1994 | Howell et al. | 707/9 |
| 5,539,906 A | | 7/1996 | Abraham et al. | 395/600 |
| 5,922,073 A | | 7/1999 | Shimada | 713/200 |
| 5,944,794 A | | 8/1999 | Okamoto et al. | 709/225 |
| 6,023,765 A | * | 2/2000 | Kuhn | 726/4 |
| 6,070,243 A | | 5/2000 | See et al. | 713/201 |
| 6,073,106 A | * | 6/2000 | Rozen et al. | 705/3 |

(Continued)

OTHER PUBLICATIONS

Tadashi Araki et al., "An Access Control Mechanism For Object-Oriented Database Systems," IEICE Transactions on Fundamentals of Electronics, Communications and Computer Sciences, vol. E76-A, No. 1 (Jan. 1993), pp. 112-121.

(Continued)

*Primary Examiner*—Matthew B Smithers
(74) *Attorney, Agent, or Firm*—Lily Neff, Esq.; Kevin P. Radigan, Esq.; Heslin Rothenberg Farley & Mesiti, P.C.

(57) ABSTRACT

A data access control facility is implemented by assigning personally identifying information (PII) classification labels to PII data objects, with each PII data object having one PII classification label assigned thereto. The control facility further includes at least one PII purpose serving function set (PSFS) comprising a list of application functions that read or write PII data objects. Each PII PSFS is also assigned a PII classification label. A PII data object is accessible via an application function of a PII PSFS having a PII classification label that is identical to or dominant of the PII classification label of the PII object. A user of the control facility is assigned a PII clearance set which contains a list of at least one PII classification label, which is employed in determining whether the user is entitled to access a particular function.

48 Claims, 8 Drawing Sheets

U.S. PATENT DOCUMENTS

| | | | |
|---|---|---|---|
| 6,141,754 A | 10/2000 | Choy ........................ 713/200 |
| 6,178,510 B1 | 1/2001 | O'Connor et al. ........... 713/201 |
| 6,253,203 B1 | 6/2001 | O'Flaherty et al. ............ 707/9 |
| 6,275,824 B1 | 8/2001 | O'Flaherty et al. ............ 707/9 |
| 6,289,344 B1 | 9/2001 | Braia et al. .................... 707/9 |
| 6,295,605 B1 | 9/2001 | Dockter et al. ............. 713/166 |
| 6,304,973 B1 | 10/2001 | Williams ..................... 713/201 |
| 6,310,538 B1 | 10/2001 | Boucher ..................... 340/5.8 |
| 6,367,016 B1 | 4/2002 | Lambert et al. ............ 713/185 |
| 6,389,542 B1 | 5/2002 | Flyntz ........................ 713/201 |
| 6,412,070 B1* | 6/2002 | Van Dyke et al. ............. 726/17 |
| 6,430,561 B1 | 8/2002 | Austel et al. ................... 707/9 |
| 7,093,298 B2* | 8/2006 | Rodriquez et al. ............ 726/28 |
| 7,134,022 B2* | 11/2006 | Flyntz ........................ 713/182 |
| 2004/0187020 A1* | 9/2004 | Leerssen et al. ............ 713/200 |
| 2004/0225883 A1* | 11/2004 | Weller et al. ............... 713/166 |

OTHER PUBLICATIONS z/OS VIR4.0 Security Server RACF Security Administrator's Guide, IBM BookManager Print Preview, SA22-7683-03, Jun. 28, 2002, IBM Corp., 1994, 2002, pp. 1-27/.

"Protecting Privacy using the Decentralized Label Model", ACM Transactions on Software Engineering and Methodology, 9(4):410-442, Oct. 2000. Andrew C. Myers, Barbara Liskov http://www.cs.cornell.edu/andru/papers/iflow-tosem.pdf.

"Complete, Safe Information Flow with Decentralized Labels", Proceedings of the 1998 IEEE Symposium on Security and Privacy, Oakland, California, May 1998, pp. 186-197. Andrew C. Myers, Barbara Liskov http://www.cs.cornell.edu/andru/papers/sp98/sp98.pdf.gz.

"A Decentralized Model for Information Flow Control", Proceedings of the 16th ACM Symposium on Operating Systems Principles (SOSP), Saint-Malo, France, Oct. 1997, pp. 129-142. Andrew C. Myers, Barbara Liskov.

"From a Formal Privacy Model to its Implementation", Simone Fischer-Hübner, Amon Ott, Proceedings of the 21st National Information Systems Security Conference, Arlington, VA, Oct. 5-8, 1998 http://www.cs.kau.se/~simone/niss98.pdf.

"Database Security: Status and Prospects", S. Jajodia, Center for Secure Information Systems, Sushil Jajodia 2003, p. 1-35.

Simone Fischer-Hübner, "IT-Security and Privacy—Design and Use of Privacy-Enhancing Security Mechanisms", Springer Scientific Publishers, Lecture Notes of Computer Science, LNCS 1958, May 2001, ISBN 3-540-42142-4, Chapter 4, pp. 167-200.

* cited by examiner

IMPLEMENTATION AND USE OF A PII DATA ACCESS CONTROL FACILITY EMPLOYING PERSONALLY IDENTIFYING INFORMATION LABELS AND PURPOSE SERVING FUNCTIONS SETS

TECHNICAL FIELD

The present invention relates in general to security of personal information within a computer system, and more particularly, to the implementation and use of a conditional access facility which controls access by users to personally identifying information (PII) objects or resources within an enterprise's computer system.

BACKGROUND OF THE INVENTION

Advances in computing and communications technologies continue to reduce privacy by making it possible for people and organizations to store and process vast amounts of personal information. To achieve privacy of data, it is necessary to protect stored data, data in transit, and to have some control over the release of data. Whereas protection of stored data is somewhat covered by emerging privacy policy languages and their enforcement, there are no mechanisms currently proposed to ensure the correct use of and therefore to control the release of personally identifying information from within an enterprise computing facility.

Traditionally, managing the security of a computer system has required mapping an organization's security policy to a relatively low-level set of controls, typically access control lists. That is, assuming individual users (persons or logical processes) are first identified and authenticated to a computing system in a satisfactory manner, their access to documents, programs, facilities, and other "objects" within the protected computer system is then controlled by a security system, for example a system security manager, simply by comparing the user's name against a list of names of persons entitled to access the given object. Generally speaking, this technique is known as discretionary access control or DAC.

According to a more sophisticated and well developed model for security of computer systems that is used extensively within the U.S. government, and elsewhere, access to objects in a computing system can be controlled by a logical system of compartmentalization implemented by way of logical security levels (which are hierarchical) and/or categories (which are not hierarchical) that are associated with users and protected computer resource objects. Such systems are referred to as "multilevel secure" ("MLS") systems and are implementations of the Bell-LaPadula security model as defined by D. Bell and L. LaPadula in 'Secure computer systems: Mathematical foundations and model' MITRE Report, MTR 2547 November 1973. Significant investment has been made in the development, verification, and implementation of such systems.

In MLS systems, users who are associated with (by assignment) the highest security levels and the largest numbers of categories are said to have the highest security levels in the system. Authority to read a protected object is granted to a user when the requesting user (after proper identification and authentication to the computing system) has an associated security level that is at least as high as that of the requested object and the user has a set of categories (one or more) that include those associated with the requested object. In this case, the user is said to "dominate" the object. Conversely, authority to write to an MLS protected object is granted to a user when the requested object has an associated security level that is at least as high as that of the requesting user and the object has a set of categories that include at least the categories that are associated with the requesting user. In this case the object is said to dominate the user. From these principals, as defined by the Bell-LaPadula model, it can be seen that MLS protected information can only become more secure as it is read from one object and written to another, as the information moves from lower to higher levels of security and/or from fewer to more categories. Conversely, a model for authorization checking that is effectively the inverse of the Bell-LaPadula model is described by K. Biba in 'Integrity considerations for secure computer systems' Technical Report 76-372, U.S. Air Force Electronic Systems Division, 1977. Biba showed both that the integrity of a data and programming system is dependent upon: the integrity of the data and programming systems that were used in its creation, and a processing model for assuring such integrity. Both the Bell-LaPadula (MLS) model and the "MLS-inverse" aspect of the Biba model are currently in use within the computing industry, for example within the program product Resource Access Control Facility (RACF) which is an optional component of the z/OS operating system offered by the International Business Machine Corporation (IBM). The z/architecture is described in an IBM publication entitled "z/Architecture Principles of Operation", publication no. SA22-7832-01, October 2001 which is hereby incorporated herein by reference in its entirety. Further, RACF is described in a publication entitled "z/OS V1R4.0 Security Server RACF Security Administrator's Guide", SA22-7683-03, IBM Corp., September 2002, the entirety of which is hereby incorporated herein by reference.

SUMMARY OF THE INVENTION

Like the requirements that led to MLS systems, the requirements for control of PII protected objects is disposed to an approach involving categorization of protected objects and the users who access them. In the case of PII, the purposes that are assigned to protected objects can be considered to be analogous to the categories that are assigned to MLS protected objects. However the requirements for control of PII data objects differs fundamentally from the requirements for control of MLS protected objects, in that PII data objects require less security-because they are less private—the more purposes (for which they may be accessed) are associated with them. Further, although the analogy can be drawn between PII purposes and MLS categories, there is no similar analogy with regard to hierarchical MLS security levels. In addition, the traditional MLS approach deals with users and objects, but for PII purposes we cannot consider simply the users, but must consider both the user together with the program (process) the user is running and the reason (purpose) that program has for accessing the PII data. There thus is a need in the art for a novel data access control facility such as presented herein which implements an efficient privacy model and allows for precise control of the release and propagation of personal information without unduly restricting information flow, for example, across an enterprise.

The shortcomings of the prior art are overcome and additional advantages are provided, in one aspect, through a method of implementing a data access control facility with provisions for controlling access to PII data objects. This method includes: assigning PII classification labels to PII data objects, wherein a PII data object has one PII classification label assigned thereto; defining at least one PII purpose serving function set (PSFS) comprising a list of application functions that read, write, or reclassify PII data objects; and assigning a PII classification label to each PSFS, wherein a PII data object is only accessible via an application function of a PII PSFS having a PII classification label that is equal to or a proper subset of the PII classification label of the PII data object.

In another aspect, a data access control method is provided which includes: invoking, by a user of a data access control facility, a particular function, the data access control facility having personally identifying information (PII) classification labels assigned to PII data objects and to at least one PII purpose serving function set (PSFS), the PSFS including a list of application functions that read or write PII data objects, and wherein the user of the data access control facility is assigned a PII clearance set, the PII clearance set for the user comprising a list containing at least one PII classification label; determining whether the particular function is defined to a PII PSFS of the at least one PII PSFS of the data access control facility, and if so, determining whether the user's PII clearance set includes a PII classification label matching the PII classification label assigned to that PII PSFS, and again if so, allowing access to the particular function; and determining whether the user is permitted access to a selected data object to perform the particular function.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
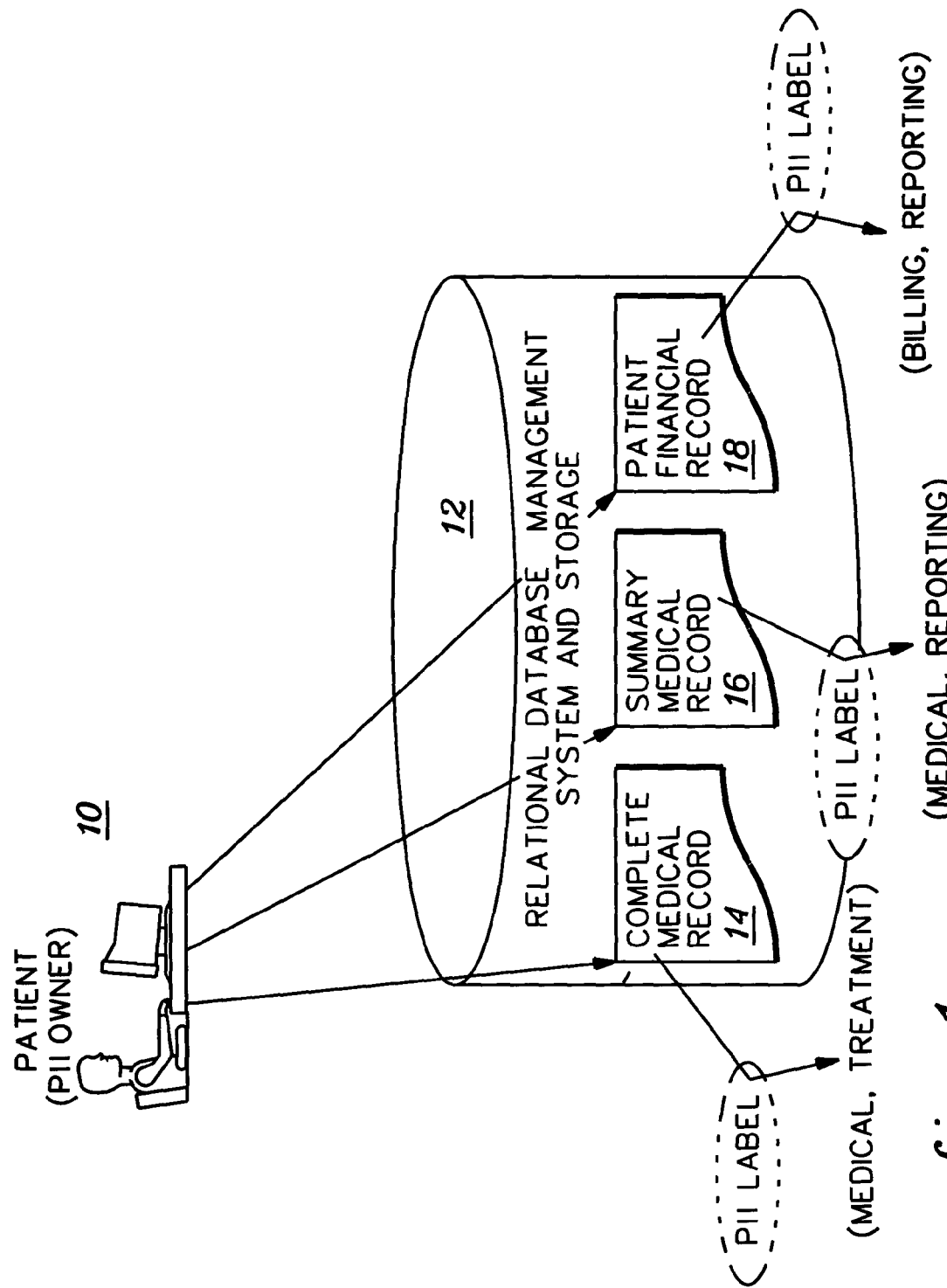
FIG. 1 depicts one example of an approach for storing personally identifying information (PII) objects with PII classification labels assigned thereto for use by a data access control facility, in accordance with an aspect of the present invention.

Presented herein is a data access control facility which provides security for personally identifying information (PII). In accordance with this facility, access to PII information is based on various "conditions" that can exist (or be in effect) during or leading up to the execution of a computer process in which the access to the privacy classified computerized resource (broadly referred to herein as "object" or "data object") occurs. Such conditions can include, but are not limited to: (1) the application function within which the user has requested access to the PII object; (2) how the user is identified and authenticated to the computing facility; (3) where the user is; (4) time of the request; and (5) other contextual and environmental factors that can be programmatically ascertained.

In accordance with an aspect of the present invention, there are several ways in which conditions can be applied to any given access control checking event. For example, (1) privacy classification can be assigned to a user dynamically based on conditions that are in effect when the user attempts to access a PII sensitive object; or (2) privacy classifications to an object can instead (or also) be dynamically based on similar, sometimes the same, conditions. Thus, a data access control facility as presented herein advantageously allows a user, or computer process, access to different "sets" of PII classified objects, and functions, according to the dynamics of the access event situation, thereby adding flexibility to and enhancing the security of information processes that require access to personally identifying information.

Broadly stated, disclosed herein (in one aspect) is a technique for implementing a data access control facility, which includes: assigning personally identifying information (PII) classification labels to PII objects, with each PII object having one PII classification label assigned thereto. At least one PII purpose serving function set (PSFS) is defined and comprises a list of application functions that read, write, or reclassify PII data objects. A PII classification label is also assigned to each PSFS. When in use, a PII object may only be read via an application function of a PII PSFS having a PII classification label that is equal to or a subset of the PII classification label of the object, or may be written to only via an application function of a PII PSFS having: a PII classification label that is equal to or dominant of the PII classification label of the object, or having a list of PII reclassifications that are allowed by the PSFS.

Operationally, use of the data access control facility includes invoking, by a user of the computing application executing within the computing system, a particular function; determining whether the particular function is defined to a PSFS of the data access control facility, and if so, determining whether the user's PII clearance set (which comprises a list containing at least one PII classification label) includes a PII classification label matching the PII classification label assigned to that PSFS, and if so, allowing access to the particular function; and determining whether the user is permitted access to a selected object to perform the particular function. Thus, as explained further below, a PII data access control facility, in accordance with an aspect of the present invention, is employed to initially determine whether a user is entitled access to a particular function, and subsequently, whether the user is permitted access to a selected data object.

Before discussing the PII data access control facility in greater detail, the following logical constructs are defined. In the example discussed herein, the PII control facility is assumed to be employed for a hospital enterprise. This assumption is by way of example only.

PII Classification Label: Lists the owner of a PII data object, and includes a list of one or more purpose(s) selected by the owner for which the PII data object so classified may be used. Example: Owner; userIDx, Purposes; Medical, Treatment, Reporting, Billing. A subsequent user of information that is contained within a PII protected data object can only use the information for purposes which were consented to by the original owner and specified in the PII classification label. The purposes for which the PII object may be used are embodied within the functions that the user is allowed to execute against the data.

PII Purpose Serving Function Set (PSFS): A list of application functions that read/write PII objects. A PSFS is itself labeled with a particular PII classification label. The list of functions within a given PSFS can include: specific programs; applications; functions within an application, such as a EJB (Enterprise Java Bean), method, database management started procedure, SQL Query, etc. A PSFS may optionally include a list of PII classification changes (reclassifications) that are allowed by the specified PSFS if and when a user, executing the specified PSFS, writes data to a PII object that has a PII label that includes purposes that are not included in the PII label(s) stored within the Current Process Label (CPL) in which are recorded the PII label(s) of PII data that the user has previously read within the same computer operating system process.

PII Data Objects: Any resource, document, program, facility, etc. with an associated PII classification label. A given PII object can have only one PII classification label. The owner of the PII data object is included in the label associated with the object, as well as the purpose(s) for which the object can be used. For completeness, the owner of a PII data object is included in this explanation because it comes into play during access control checking at a point after the PII access control checking, that is the subject of the present invention, has completed its part in the overall access control checking process. More specifically, owners of PII protected data objects may access only their own data objects and not PII protected data objects that are owned by another owner, and this concept is enforced by Discretionary Access Control checking known within the art as DAC.

Subjects: User-IDs and Group-IDs (groups of User-IDs) includes owners (of PII data), and enterprise users, i.e., those who access data objects and are given permission, by enterprise security administration, to execute functions with particular Purpose Serving Function Set(s) as part of their enterprise function.

User PII Clearance Set: a list of PII classification label(s) assigned to an enterprise user. The user PII clearance set establishes the Purpose Serving Function Set or sets from within which users are authorized to execute functions within the enterprise. For example, an administrator may have a PII clearance set of {reporting}, {billing, reporting}, and so is thereby authorized to execute functions that are defined to be within Purpose Serving Function Sets that have PII labels of either {reporting} or {billing, reporting}. A doctor may have a PII clearance set of {medical}, {medical, reporting}, so is authorized to execute functions that are defined to be within Purpose Serving Function Sets that have PII labels of either {medical} or {medical, reporting}. A nurse may have a PII clearance set of {treatment}, {medical, treatment}.

PII Current Process Label (CPL): a PII label that is dynamically assigned to the user's operating system process and updated accordingly as the user accesses PII protected objects. The CPL is dynamically updated to contain a record of the PII label of any PII object and or objects that the user reads during a given computer operating system process.

A security administrator is assumed to set up the PII data access control facility for a particular enterprise. Administratively, implementing the facility can include:

1). The security administrator defining a valid set of purposes to a security manager such as, for example, IBM's RACF that embodies the PII data access control facility. For a hospital example:

Valid PII purposes for this enterprise might include:
Purpose 1 (example: medical)
Purpose 2 (example: treatment)
Purpose 3 (example: billing), . . .
Purpose n (example: reporting).

2). Security administrator assigns PII labels to various resources/objects.
Object-name (example: Summary Medical Record)
PII classification label (example: {medical, reporting}).

3). Security administrator defines individual users and groups of users, which is an ongoing activity. For example, users may change daily.
UserID-a (example: user who is a patient) add to group PATIENTS
UserID-x (example: user who is a nurse) add to group NURSES
UserID-y (example: user who is a doctor) add to groups DOCTORS.

4). Security administrator assigns a user PII Clearance set to each appropriate user. For example:
UserID-x (example: user who is a nurse) PII Clearance set (example: [{treatment}, {medical, treatment)}]).

5). Security administrator defines Purpose Serving Functions Set(s) to security manager.
PSFS name1
  List of associated program functions
    Program x
    Method y
    Enterprise Java Bean z.

6). Security administrator assigns PII label to a PSFS PSFS name1—PII classification label. {medical, treatment}.

7). Security administrator assigns PII reclassifications that are allowed to occur when this PSFS is used to write to a PII object: Reclassifications allowed: FROM {medical,treatment} TO {medical, reporting}. A given PSFS may have multiple (and therefore a list) of reclassifications that are allowed during its execution.

FIG. 1 depicts one example of a personally identifying information (PII) owner 10 (such as a patient in a hospital enterprise example) entering (or accessing) PII objects, such as Complete Medical Record 14, Summary Medical Record 16, and Patient Financial Record 18, into (or in) a relational database management system and storage 12, in accordance with an aspect of the present invention. Operationally, patient 10 may invoke a particular function within a purpose serving function set (PSFS) created for patient use. This particular function can be used to store PII data objects within the relational database management system, such as a DB2 relational database management system offered by International Business Machines Corporation, which is described in publication DB2 UDB for OS/390 V7 *An Introduction to DB2 for OS/390*, SC26-9937-02, October, 2002 which is hereby incorporated herein by reference in its entirety. Data can be stored in individual table-row-column positions with appropriate predefined PII classification labels. The patient's personal data thereafter resides within various PII data objects with different PII classification labels. In the example of FIG. 1, the labels {medical, treatment}, {medical, reporting} and {billing, reporting} are shown by way of example only. Subsequently, patients may view their own PII data objects via a designated PSFS function, which would allow a particular patient to view only PII objects for which that patient is the owner.

Figure 2:
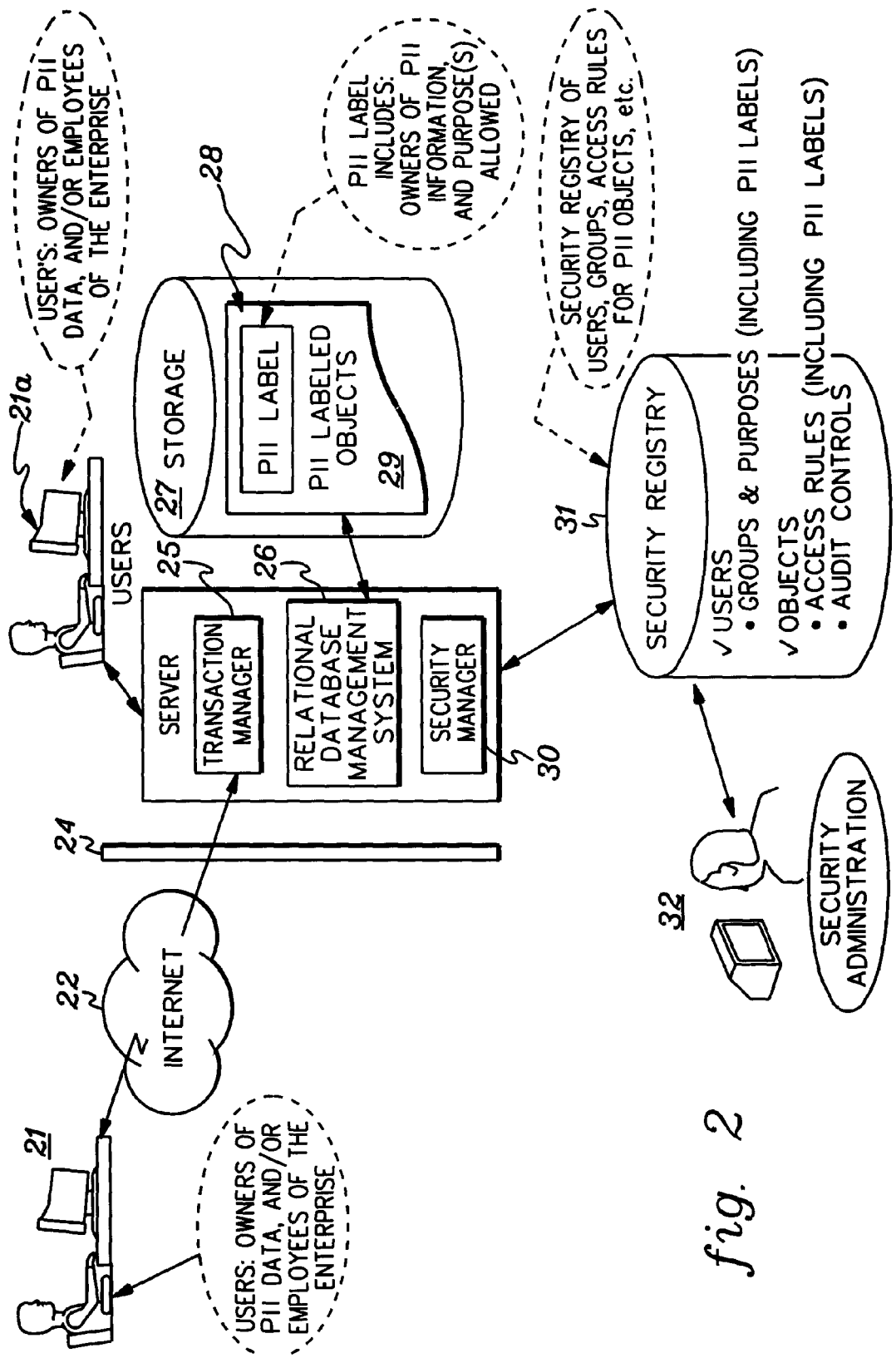
FIG. 2 depicts one embodiment of a computing environment to incorporate and use one or more aspects of a data access control facility, in accordance with an aspect of the present invention.

FIG. 2 depicts one example of an enterprise computing environment implementing a PII data access control facility such as disclosed herein. In this example, a user 21, such as an owner of PII data and/or an employee of the enterprise accesses a transaction manager 25, running on a server within the enterprise, from across the Internet 22, and through a firewall 24. Alternatively, users 21a, inside firewall 24 could directly access the server containing transaction manager 25. A relational database management system 26, which also resides on the server in this example, accesses PII labeled objects 29 contained in tables 28 in an associated storage 27. Object storage 27 may take any desired form. A security manager 30, such as the above-referenced RACF offered by International Business Machines Corporation as an option for of the z/OS operating system, consults a security registry 31 which is maintained by the security administration 32 for the enterprise. Registry 31 may define users, including groups, and purposes, with associated PII labels, and may define object categories, including access rules, audit controls, etc.

Operationally, and as explained in greater detail below, a user's request to the transaction manager to execute a particular function (which may or may not be defined within a PSFS) results in the creation of a "process" within the operating system. This can occur as the result of a request from a user who is connected to the computing system via the Internet or from a user who is locally connected, for example, an employee. The operating system platform security manager which embodies the PII data access control facility that is the subject of this invention, is invoked by the transaction manager to determine the user's authority to execute the requested function. Once approved, the function begins execution and subsequently, as part of its normal processing, generates a request via the transaction manager for (it is assumed) PII labeled data that is under the control of the relational database management system. The database management system invokes the security manager to determine whether the requesting user is permitted access to the desired PII object. The security manager renders a decision based, for example, on the PII label associated with the requested object, the PII label associated with the user, and other relevant access rules for the object. Again, the PII labels and other access rules can be established and maintained by a security administrator and stored on the security registry addressable by the security manager.

Figure 3:
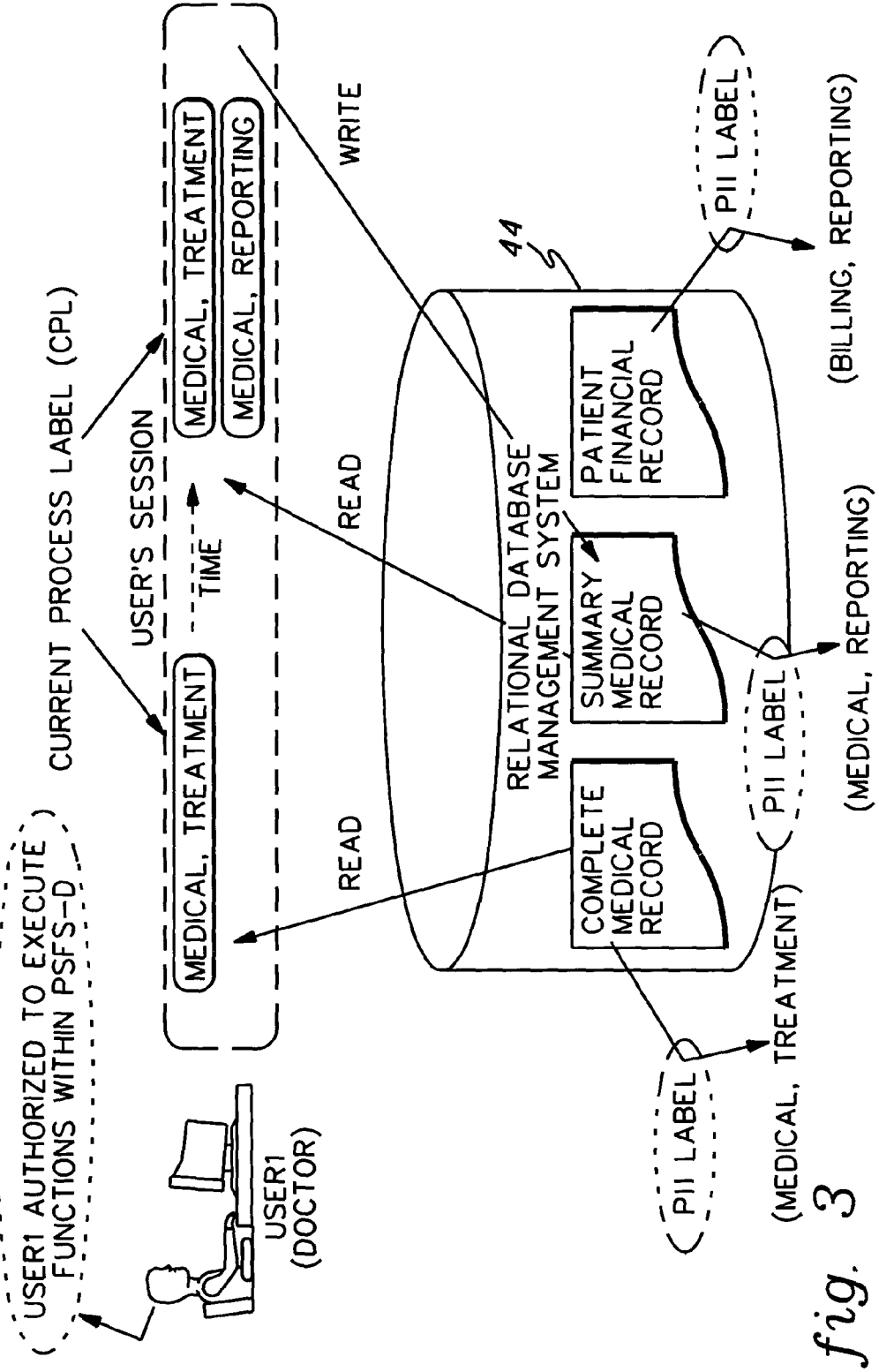
FIG. 3 is an operational example showing a user's current process label (CPL) undergoing a change within an established process, as a user reads and writes data from and to PII data objects, in accordance with an aspect of the present invention.

FIG. 3 illustrates information flow, exploiting purpose serving function sets within a hospital environment in accordance with an aspect of the invention.

In this example, a user, such as a doctor, signs on to the facility and from his current operating system process, attempts to execute a particular application function. The user has been assigned, by enterprise security administration, a user PII clearance set, which in this example is assumed to comprise [{medical}, {medical, reporting}, {medical, treatment}]. If the particular function is within a PII purpose serving function set (PSFS), then the user's PII clearance set must include the PII label assigned to that PSFS (see FIG. 4A) for the user to be allowed to execute the particular function. For example, using the PSFS classification label "medical" 41, the user, such as the doctor, can proceed to read "Complete Medical Record" from relational database management system 44. Upon reading the "Complete Medical Record" which has a PII label of {medical, treatment}, the user's Current Process Label (CPL) is set to the label of the data thereby keeping a "history" of the label of any data read into the user's current operating system process. The CPL is later referred to during part of the authorization processing preceding any write operation that occurs from within this process, to assure that PII data is only written to other PII labeled data objects that have labels with identical or fewer purposes, or that PII data reclassification is allowed using this PSFS with this particular combination of PII data that has been read into this process and PII data that is being written out. For example, a user, who has a user clearance of {medical, reporting} within his user clearance set, and can therefore execute functions that are defined to be within the purpose serving function set "PSFS-D" which has a PII label of [{medical}], can read from but not write to the "Complete Medical Record" and because PSFS-Dis allowed PII reclassification from {medical, treatment} to {medical, reporting} can both read from and write to the "Summary Medical Record". Conversely, the user cannot invoke a function defined within a PSFS that has a PII classification label that is not defined within the user's PII clearance set and thereby access PII objects outside of the scope of the user's PII clearance set. For example, user1 of FIG. 3 cannot read or write "Patient Financial Record".

Figure 4:
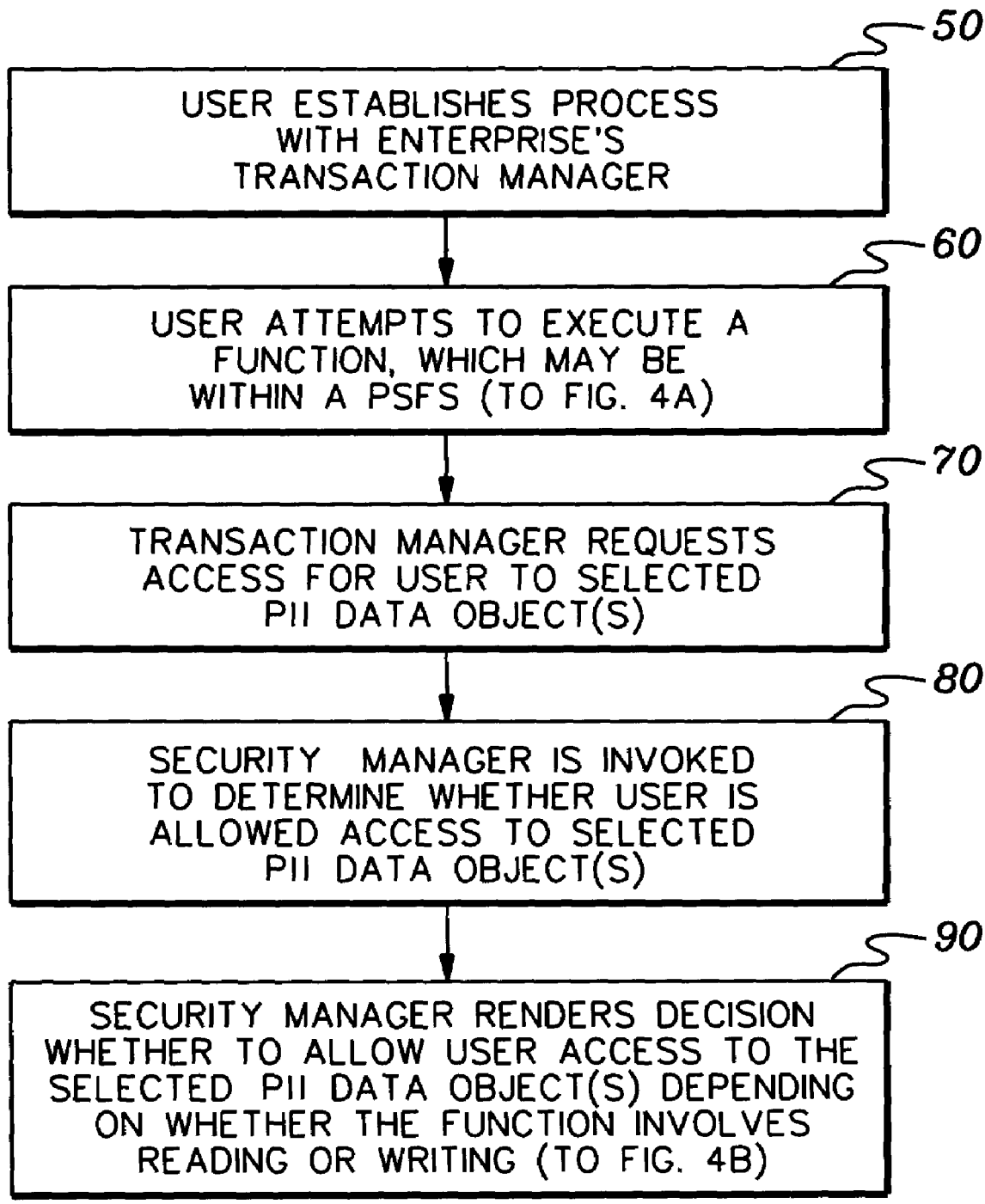
FIG. 4 is a flowchart of one embodiment of processing implemented by a PII data access control facility, in accordance with an aspect of the present invention.
Figure 4A:
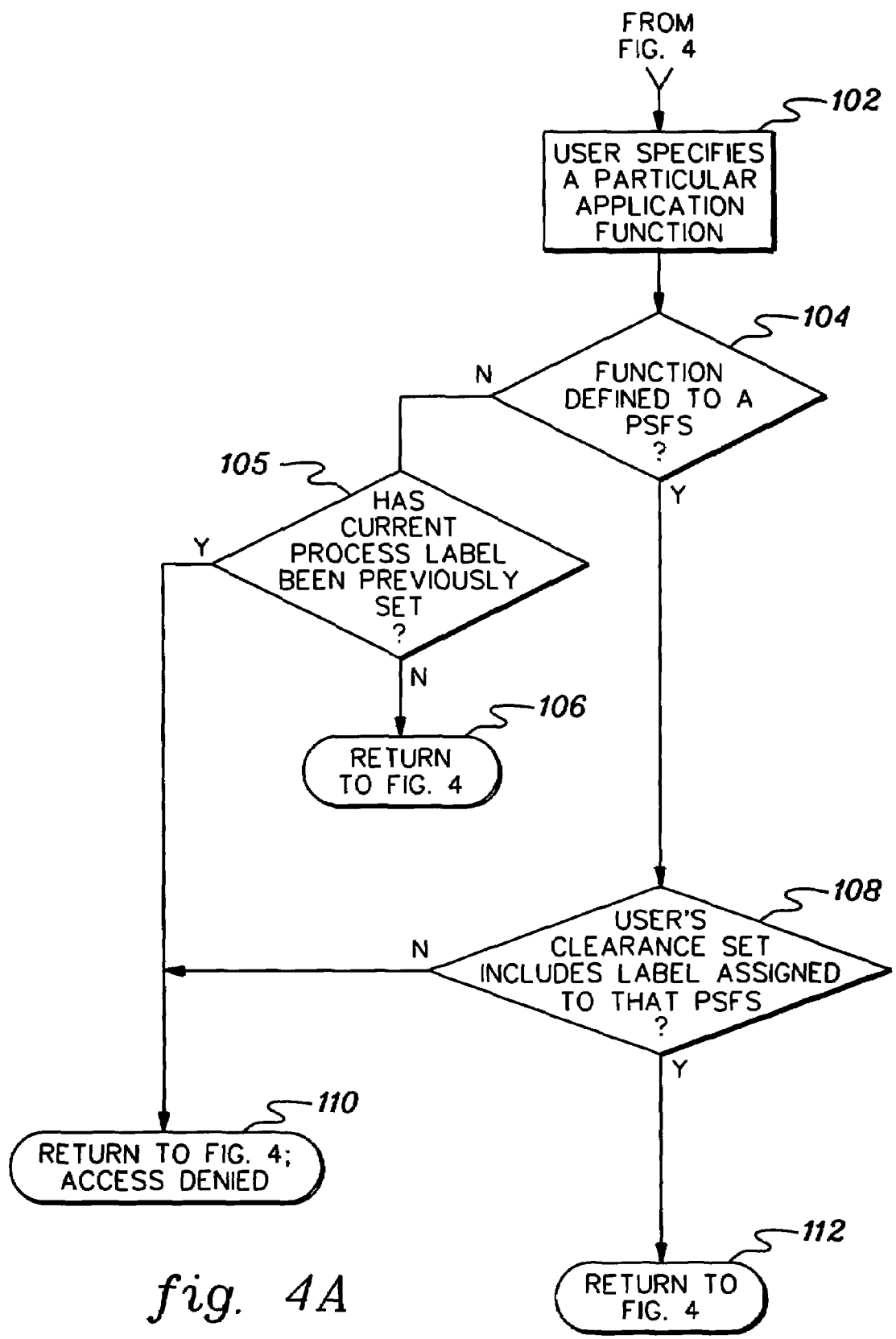
FIG. 4A is a flowchart of one logic embodiment for ascertaining whether a user can employ a particular function, in accordance with an aspect of the present invention.
Figure 4B:
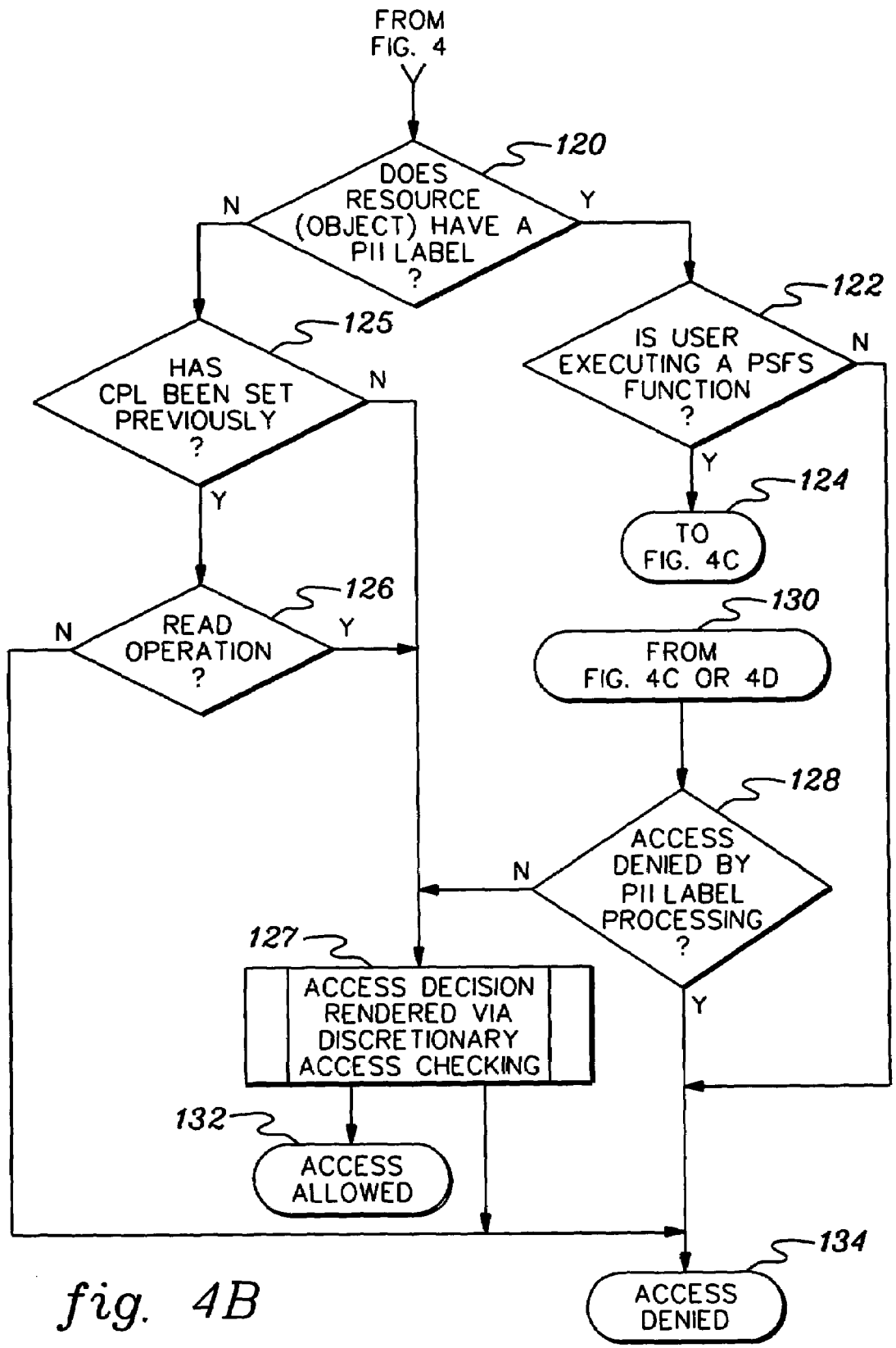
FIG. 4B is a flowchart of one logic embodiment for determining whether to allow a data access to occur, including for determining whether the requested object comprises a PII data object, in accordance with an aspect of the present invention.
Figure 4C:
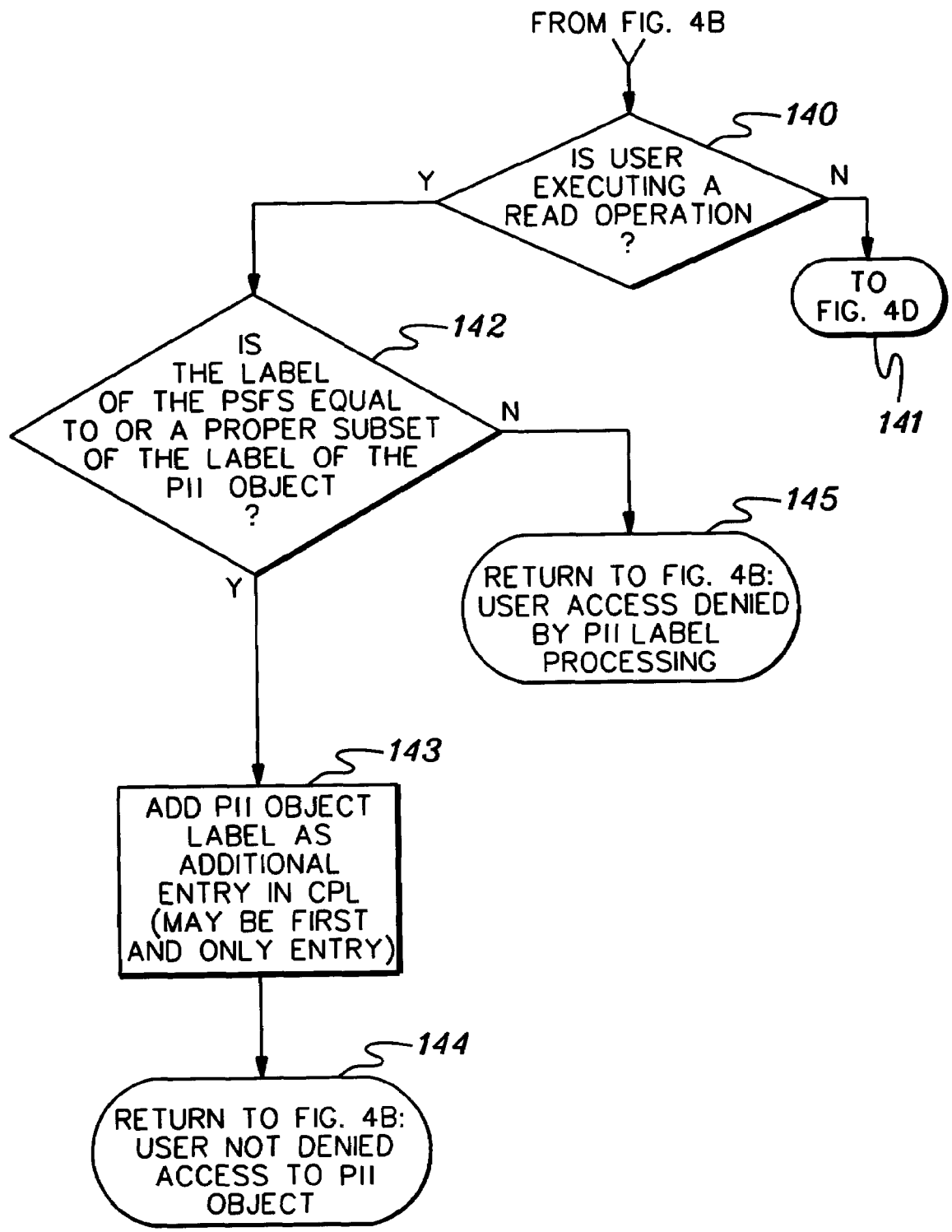
FIG. 4C is a flowchart of one logic embodiment for determining whether a user can continue as a PII controlled process when the particular function desired comprises a read operation, in accordance with an aspect of the present invention.
Figure 4D:
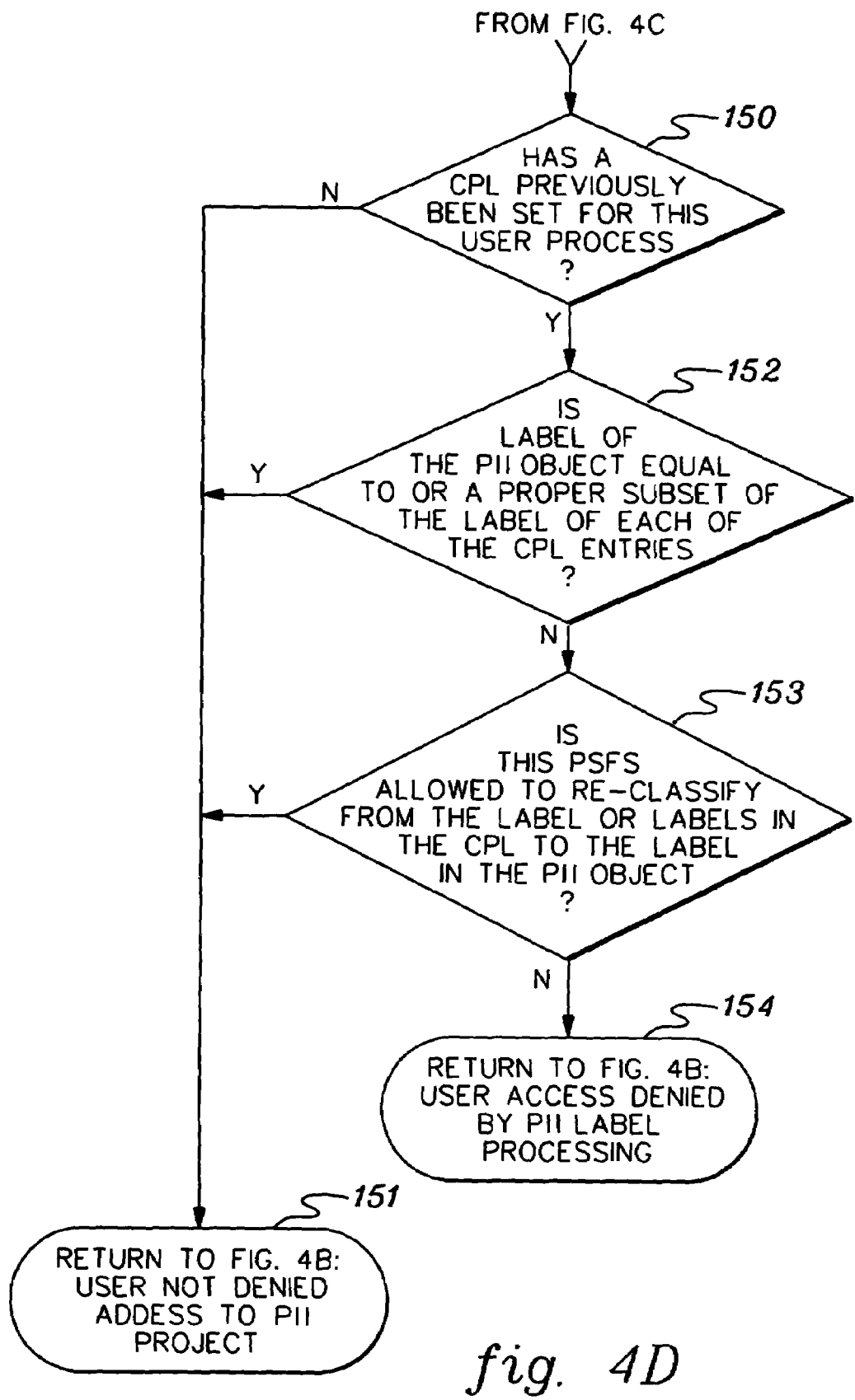
FIG. 4D is a flowchart of one logic embodiment for determining whether a user can proceed as a PII controlled process when the particular function desired comprises a write operation, in accordance with an aspect of the present invention.

FIGS. 4-4D depict in greater detail an example of the above-introduced processing of a PII data access control facility in accordance with an aspect of the present invention. Referring to FIG. 4, use of a PII control facility begins with a user making a request to a transaction manager 50, to execute a pre-established application function which may be defined within a purpose serving function set (PSFS) 60. This results in the logical creation of a "process" within the operating system platform within which the transaction manager itself executes. Also executing within the operating system platform or logically connected to it, is a data access control facility implementing the personally identifying information (PII) concepts disclosed herein. One example of logic for processing the user's attempt to execute a function is described below in connection with FIG. 4A. Assuming that the user is allowed access to the particular function, then the transaction manager requests access for the user to a selected PII data object 70. The security manager is invoked to determine whether the user is allowed access to the selected PII object 80, and the security manager renders a decision whether to allow the user access. This decision whether to allow the user access to the selected PII data object is based, in part, on whether the particular function involves reading or writing 90. One embodiment of logic for determining whether to allow access to a particular PII data object is presented in FIGS. 4B-4D.

As noted, FIG. 4A is one example of processing implemented when a user attempts to execute a particular function. As one example, this processing might be called from step 60 of FIG. 4. Initially, a user specifies a particular application function 102 and security manager processing determines whether the function is defined to a PSFS 104. If the particular function is not defined to a PSFS 104, then security manager processing determines whether the current process label (CPL) has been previously set 105, and if so, security manager processing returns to FIG. 4, with access to the particular function denied 110. If the current process label has not been previously set, then security manager processing simply returns 106 to FIG. 4, to further evaluate whether the user is allowed access to a selected data object. If the particular function is defined to a PSFS 104, then security manager processing determines 108 whether the user's PII clearance set includes a PII classification label assigned to that PSFS. If the user's clearance set does not include a PII classification label assigned to that PSFS, then the user is denied access to the function and processing returns to FIG. 4.

If the user's clearance set does include a PII classification label assigned to that PSFS 108 then application processing continues via 112 until at some point the application makes a request for a PII data object via the transaction manager 70 in FIG. 4 which passes the request on to the data base manager (for example DB2) which invokes the security manager 80 in FIG. 4 which determines if the user is authorized to access the protected data object and renders a decision 90 in FIG. 4 which is returned to the data base manager for appropriate action.

FIG. 4B depicts one example of a decision process which can be implemented by the security manager when evaluating whether to allow a user access to a selected PII data object. Initially, processing determines whether the object has a PII label 120. If not, and the current process label for the user's process has not been previously set 125, then security manager processing renders an access decision via conventional discretionary access control checking 127. Discretionary access control (DAC) checking is an approach for doing access control checking, and is based on access control rules associated with protected resources/objects via the facilities of an operating system's security manager, for example, the RACF security manager offered by International Business Machines Corporation with the z/OS operating system. Access control rules contain, among other things, access control lists (ACLs) that include access-mode entries for specific users and user groups. DAC checking can be used when there is no PII label (purpose) associated with the protected object, and after PII label processing has occurred to further qualify (or refine) the access control decision. DAC checking like PII access control checking may employ an access-mode, which is a specific activity against an object. Examples of access modes relevant to DAC checking include create, delete, update, update but not read, and read. Rules for access, which are referred to as "resource profiles" in IBM's RACF, are also specified. Generally speaking, such rules take the form: "subject" can perform access-mode against "object". Again, any discretionary access control checking approach may be employed at this stage in the processing of FIG. 4B. Discretionary access control checking 127 renders a decision whether to allow the user access to a selected object. This decision is either access allowed 132 or access denied 134. A further explanation of discretionary access control (DAC) can be found within IBM publication Z/OS V1R4.0 *Security Server RACF Security Administrator's Guide*, SA22-7683-3 September, 2002. If the CPL for the user's "process" has been previously set 125, then security manager processing determines whether the particular function is a read operation 126. If so, then a decision is rendered whether to allow access to the object using, e.g., DAC checking 127. If the particular function is other than a read operation, then access is denied 134 because writing to a non-PII protected object from a computer operating system process after having read a PII protected object(s) into that process in not allowed.

Assuming that the object does have a PII classification label, then security manager processing determines whether the user is executing a PSFS function 122. If so, processing proceeds 124 to FIG. 4C. Otherwise, access is denied by the PII label processing 134 since the selected object has a PII label and the user is not executing a PSFS function.

On return from FIG. 4C or FIG. 4D 130, security manager processing determines whether access has been denied by the PII label processing 128. If not, then the access decision is rendered using, for example, discretionary access control checking 127. Otherwise, access is denied 134.

Assuming that the user is executing a PSFS function, then processing (FIG. 4C) determines whether the user is executing a read operation 140. If not, the user must be executing a write operation so accordingly processing continues with FIG. 4D. If yes, a determination is made 142 whether the label of the PSFS is equal to or a proper subset of the label of the PII object. If not, then processing returns 145 to FIG. 4B and the user is denied access by PII label processing because this PII object cannot be read with this particular PSFS. If 142 yes, then the label of the PII object is added 143, as an entry, to the CPL. This could be the first entry in the CPL or it could be an additional entry to an existing CPL. If an entry already exists in the CPL that is equal to the label of the PII object, then this step is bypassed. Processing now returns 144 to FIG. 4B, and the user is not denied access to the PII object by PII label processing.

If the user is not executing a read operation, which means that the user is executing a write operation, then from step 140, security manager processing proceeds to FIG. 4D to first determine 150 whether the current process label (CPL) for the user's process has previously been set. If not, then processing returns 151 to FIG. 4B with the user's process continuing as a PII controlled process and the user being allowed to write non-PII data into an existing PII data object. If 150 yes, then the determination is made 152 whether the label of the PII object is equal to or a proper subset of the label of each of the CPL entries (there may be only one). If yes, the processing continues 151 with a return to FIG. 4B as described above. In 152 no, then a determination is made 153 to see whether this PSFS has sufficient authority to reclassify PII object(s) from label or labels in the CPL to the label in the PII object being written to. If no, then processing returns 154 to FIG. 4B with the user being denied access to the PII data object. If 153 yes, then processing continues 151 with a return to FIG. 4B as described above.

The following is a formal expression of the theoretical foundation of several of the concepts disclosed with the present invention. Assumed to exist are sets of objects O, subjects S, and actions A. Further, each action $a \in A$ can be interpreted to have either read mode or write mode. Subjects and objects are labeled with sets of purposes. Label $l_1$ dominates label $l_2$ if and only if $l_1 \geq l_2$; i.e., purpose set $l_1$ is a super set of purpose set $l_2$. Generally, in order to read PII data that is protected by the present invention, a user must be executing and therefore authorized (or cleared) to execute a PSFS that itself has a PII label which is dominated by the label of the data the user is attempting to read. That is the PSFS and by association, the user who is executing it, must have a PII label with one or more purpose(s) that are in the label of the PII object being read.

Privacy Labels

Every instance of personal data has an associated label. A label L contains a set of purposes; these are the purposes for which the owner of the personal data has given consent. An object with more purposes is less private and thus the data flow between objects can only be from objects with more purposes into objects with fewer purposes, unless under specially defined circumstances. Thus, as data flows through the system during computation, its labels become more restrictive unless specially controlled circumstances (processes) allow the data to be reclassified in a controlled manner.

The set of labels forms a pre-order with the essential properties of a security-class lattice. Each element in the lattice is one of the possible labels. Labels exist in a partial order as defined by the restriction relation, $\leq$. The least restrictive label, written as BOT, corresponds to data that can flow anywhere; the greatest possible restriction, TOP corresponds to data that can flow nowhere; it is readable by no one. As you go up in the lattice, labels become strictly more restrictive. Data always can be re-labeled upwards in the lattice, which means that it can be used for fewer purposes, because restriction does not create a possible information leak. Note that label BOT corresponds to public information; i.e., data that does not include personal information.

A re-labeling of personal data is a restriction if the new label contains the same or fewer purposes. The expression $L_1 \leq L_2$ means that $L_1$ is less restrictive than or equal to $L_2$, and that data can be re-labeled from label $L_1$ to $L_2$ as represented by the following expression in which the operator $\supseteq$ indicates a super set relationship.

$L_1 \leq L_2 \equiv L_1 \supseteq L_2$ We also say that label $L_2$ dominates label $L_1$ if and only if $L_1 \leq L_2$.

When a computation (or action expressed as a PSFS) combines two values labeled with $L_1$ and $L_2$, respectively, the result should have the (least restrictive) label that enforces all the usage restrictions specified by $L_1$ and $L_2$. The least restrictive set of policies that enforces all the policies in $L_1$ and $L_2$ is simply the intersection of the two sets of policies. This least restrictive label is the least upper bound or join of $L_1$ and $L_2$, written $L_1 \sqcup L_2$;

$L_1 \sqcup L_2 \equiv L_1 \cap L_2$. For example, a combined object (e.g., a record containing both an address and a credit card number) can only be used for the intersection of the purposes.

For example, a lattice with labels composed over three purposes is assumed: billing, medical, and reporting. Such a lattice can be shown by its Hasse diagram, (described in Skiena, S. "Hasse Diagrams." §5.4.2 in *"Implementing Discrete Mathematics: Combinatorics and Graph Theory with Mathematica"*. Reading, Mass.: Addison-Wesley, p. 163, 169-170, and 206-208, 1990) in which the "less restrictive" relation$\leq$goes from bottom to top with transitive and reflexive edges omitted. An object that can be used for purposes medical and reporting would be labeled {medical, reporting}. Data from this object could be copied into an object with label {medical} or with label {reporting}. A subject (or user) must have an effective label (as derived from the PSFS the user is executing) of {medical}, {reporting}, or {medical, reporting} in order to be able to read that object. Note that, by default, due to the "read down/write up" properties, information can only flow upwards in the lattice.

Note again that the purposes contained in a label L do not represent rights but rather restrictions. Thus, the fewer purposes a subject serves the more objects it can read provided the subject serves at least one purpose associated with the PII object to be read.

Subject s may read PII object o if and only if the purposes that are associated with subject s is a sub set of, or equal to the purposes that are associated with object o.

Subject s may write PII object o if and only if the purposes that are associated with object o are a sub set of, or equal to the purposes that are associated with subject s.

For example, a user with label {billing, reporting} may read an object with label {billing, medical, reporting} and may write to an object with label {billing}.

Well-formed Star Property

If the Current Process Label (CPL) of a user's computer operating system process is treated as "high-watermark" then it can float up the lattice but not down. As the user reads various personal data with a given PSFS the CPL reflects the purposes associated with PII data objects read, therefore floating up the lattice until the user's clearance which is a function of the PSFS(s) that the user has been cleared (authorized) to execute, has been reached. For example, user Jane may be cleared to execute a PSFS with a label of {medical}. By reading an object labeled {medical, reporting}, with this PSFS, her CPL becomes {medical, reporting}. Reading information from an object labeled {medical} causes her CPL to include an additional entry of {medical} thereby correctly reflecting the labels of the information she has read into her current process. With her CPL in this state, she will, by default, be able to execute a PSFS (perhaps but not necessarily the same one as she used for reading) to write out the information she has read into her process, into PII objects with a label of {medical}. Note that she is reclassifying some of the information she has read from {medical, reporting} to {medical}, but this is allowed by default because {medical} is farther up the lattice (fewer purposes or more restrictive) than {medical, reporting}.

The data flows and resultant reclassification of information discussed so far are similar in some respects to data flows in MLS controlled processing environments. But while MLS addresses the requirement for tools capable of providing strict adherence to the rules for compartmentalized access control of computer resources (for example, data) for security reasons, there remains the need for privacy support that allows reclassification of PII according to flexible rules that can be specified by the enterprise. In other words, privacy support must include be a way for the enterprise to specify that certain users (or groups of users) are authorized to reclassify PII from a specific predefined classification to another specific predefined classification, but to do so only within the confines of a predetermined set of functions that cannot themselves be changed or manipulated by the user who is authorized to execute them. This need is provided by another aspect of the present invention, that is the "reclassifications allowed" construct of the definition of and entry that describes the Purpose Serving Function Set (PSFS).

Selected users are cleared (authorized) to execute any/all PSFSs including those that are capable of and permitted to reclassify PII data objects. We refer to this concept as "well formed star property" which is expressed within the present invention as the set of clearances to PSFSs that a user may have been assigned by security administration because of the user's position in the enterprise.

Hospital Example

In order to illustrate the concepts expressed within the present invention, we use a hospital enterprise as a metaphor. Doctors, nurses, administrative employees, and patients appear in our example as PII information that is owned by patients flows through the hospital computing system and is accessed and used by various hospital staff. Here then starts this example.

The hospital's privacy statements are assumed to address four object categories. A General Record contains general, personal information, such as name, address, etc., with billing and medical purposes and maybe some more purposes. A Medical Record contains medical data about the patient, for medical purposes only. A Summary Medical Record is used for billing purposes only. It contains exactly what medical data goes into bills, e.g., as prescribed by insurance policies. A Financial Record is used for billing purposes only. It contains insurance details, prices, dates of sending bills and payment, etc.

Internally in the hospital, there are principals acting in the roles of administrator, nurse, and physician. Access is regulated by the following informal privacy policy: Only the hospital's physicians and nurses have access to the Purpose Serving Function Set(s) that are authorized to execute against (to read and perhaps write) the detailed data stored in the Medical Record. In this manner, the hospital's physicians and nurses are said to have been "cleared" for the Medical Record. The Summary Medical Record is confidential information that the hospital does not release to nurses. Only the hospital's administration and physicians have access to these data. Only the hospital's administration has access to the Financial Records. On the one hand, there are exclusive access rights: Physicians must not be cleared to read the Financial Record and administrators must not be cleared to read the Medical Records. On the other hand, information should only flow from the Medical Record via the Summary Medical Record into the Financial Record.

With the capability of "trusted subjects" who are cleared to execute PSFSs that have been predefined by hospital computer security administration as having the capability to safely and correctly reclassify and even to downgrade in a controlled fashion, another specification of the hospital policy can be given.

First administrators get cleared to execute functions within a purpose serving function set that has a PII label of reporting and physicians likewise get cleared for purpose medical. This gives both parties the possibility to read Summary Records. Additionally, an administrator can read Financial Records and a physician can read Medical Records but not vice versa. Finally, to allow the flow of information from Medical Records to Summary Records in only a predefined, safe and correct manner, the clearance of physicians can be defined for example to include the label set {{medical}, {medical, reporting}}. Thus, a physician may start by executing a PSFS, to which she has been cleared, with label {medical}, which allows her to read the Medical Record and the Summary Record. Then by executing a PSFS, the definition of which includes the "reclassification allowed" clause: FROM {medical} to {medical, reporting}, she is allowed to downgrade PII that was labeled {medical} to {medical, reporting} but only through the enterprise defined function contained within the PSFS. Note that the physician never can read or write the Financial Record.

Correspondingly, an administrator may start by executing a PSFS with label {reporting}, which allows her to read the Summary Record as well as the Financial Record. Then by executing a PSFS, the definition of which includes the "reclassification allowed" clause: FROM {reporting} to {billing, reporting}, she is allowed to downgrade PII that was labeled {reporting} to {billing, reporting) but only through the enterprise defined function contained within the PSFS. Again, the administrator can never read or write the Medical Record.

Note that information can only flow from the Medical Record to the Summary Record via a physician and from the Summary Record to the Financial Record via an administrator.

To prevent a nurse's capability to read the Summary Record, the additional purpose treatment can be introduced. Nurses (by way of the functions defined within PSFS(s) that they are cleared to execute), as well as the Medical Records have label {medical, treatment}. Thus, nurses can read and write Medical Records but have no access to the other objects. This completes the specification of the example policy.

In the example specification, physicians are not allowed to write Medical Records. This might be regarded as a limitation. However, the specification can be extended to give physicians this additional power by changing their PSFS clearance to include multiple PSFSs that are labeled {medical}, {medical, reporting}, {medical, treatment} respectively. Thus, a doctor could read and write the Medical Record, when doing her medical work when using a PSFS with label {medical, treatment}. However, when she intends to do administrational work, she executes a function within a PSFS with label {medical} to read the medical information. When she decides to "reclassify" some detailed medical information, protected by label {medical, treatment}, into the Summary Record, she executes a PSFS which has been predefined with the authority to reclassify and thus downgrade PII from label (medical, treatment} to label {medical, reporting}.

Advantages

Those skilled in the art will note from the above description that by employing a data access control facility such as described herein, a security administrator can define and establish a specific set of computer functions in accordance with a particular operational sequence that meets the business needs of an enterprise when working with sensitive personally identifying information (PII) objects. Such pre-established and controlled sets of functions and the associated sequence of operation are the only processes that can access such PII objects, thus ensuring that the PII objects can be used only in the manner described by the enterprise privacy policy. The data access control facility presented is based on new logical constructs, including the notion of classification of data objects and users according to the level of privacy required for an object (which translates to the purposes for which the object can rightfully be used) and the grouping of functions into purpose serving function sets which are authorized to users in accordance with the clearance to PII objects required by individual users. Further, a data access control facility in accordance with the present invention allows a user (or computer process) access to different sets of PII classified information and functions according to the dynamics of an access event situation, thereby adding flexibility to and enhancing security of information processes that require access to PII objects.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of implementing a data access control facility, said method comprising:
   assigning personally identifying information (PII) classification labels to PII data objects, wherein a PII data object has one PII classification label assigned thereto;
   defining at least one PII purpose serving function set (PSFS) comprising a list of application functions that read or write PII data objects;
   assigning a PII classification label to each PSFS, wherein a PII data object is only read accessible via an application function of a PII PSFS having a PII classification label that is equal to or a proper subset of the PII classification label of the PII data object;
   wherein a PII data object is write accessible by an application function of a PII PSFS having a PII classification label that is equal to or dominant of the PII classification label of the PII data object; and
   wherein the PII data object may be write accessible by an application function of a PII PSFS having a list of PII reclassifications which are allowed to that PII PSFS.

2. The method of claim 1, further comprising identifying a user invoking a particular function of the data access control facility, and assigning a PII clearance set to the identified user, wherein the PII clearance set comprises a list of one or more PII classification labels for the identified user.

3. The method of claim 1, wherein the PII classification label assigned to the PII data object includes an identification of an owner of the PII data object.

4. The method of claim 1, wherein the PII classification label assigned to the PII data object includes an indication of at least one purpose for which the data object may be used.

5. The method of claim 1, further comprising initially defining PII purposes within an enterprise to use the data access control facility, and employing the PII purposes in defining the PII classification labels assigned to the PII data objects and assigned to the at least one PSFS.

6. A data access control method comprising:
   (i) invoking, by a user of a data access control facility, a particular function, said data access control facility having personally identifying information (PII) classification labels assigned to PII data objects and at least one PII purpose serving function set (PSFS) including a list of application functions that read, write or reclassify PII data objects, and having a PII classification label assigned thereto, and wherein the user of the data access control facility has assigned thereto a PII clearance set, the PII clearance set for the user comprising a list containing at least one PII classification label;
   (ii) determining whether the particular function is defined to a PII PSFS of the at least one PII PSFS of the data access control facility, and if so, determining whether the user's PII clearance set includes a PII classification label matching the PII classification label assigned to that PII PSFS, and if so, allowing access to the particular function;
   (iii) determining whether the user is permitted access to a selected data object to perform the particular function;
   further comprising, prior to said invoking, establishing a process within an operating system under security control of the data access control facility, and wherein said invoking occurs within said established process; and
   wherein said determining (ii) further comprises denying access to the particular function if the particular function is not defined to a PII PSFS of the data access control facility, and a current process label (CPL) has been previously set for the established process.

7. The data access control method of claim 6, wherein said determining (iii) comprises determining whether the selected data object comprises a PII data object, and if so, verifying that the user's particular function is defined to a PII PSFS of the at least one PII PSFS of the data access control facility, and if not, denying access to the selected data object.

8. The data access control method of claim 7, wherein said determining (iii) further comprises determining whether the particular function comprises a read operation, and if so, determining whether the PII classification label assigned to the PII PSFS to which the particular function is defined is equal to or a proper subset of a PII classification label associated with the selected data object, and if not, denying access to the selected data object, and if so, adding the PII classification label of the selected data object to a current process label (CPL) list for the established process.

9. The data access control method of claim 7, wherein said determining (iii) further comprises determining that the particular function is other than a read operation, and when so, determining whether a current process label (CPL) list for the established process exists, and if not, allowing an access decision to the selected data object to proceed via discretionary access control checking.

10. The data access control method of claim 9, wherein if the CPL list for the established process exists, determining whether the PII classification label of the selected data object is equal to or a proper subset of each of the CPL entries, and if so, allowing an access decision to the selected data object to proceed via discretionary access control checking.

11. The data access control method of claim 10, wherein if the PII classification of the PII data object is not equal to or a proper subset of the PII classification label of each CPL list entry, then the method further comprises determining whether the PII PSFS to which the particular function is defined allows reclassification from the PII classification label(s) in the CPL list to the PII classification label of the PII data object, and if so, allowing an access decision to the selected data object to proceed via discretionary access control checking, otherwise, denying the user access to the PII data object.

12. The data access control method of claim 7, further comprising providing a current process label (CPL) list for the established process, the CPL list comprising a dynamic list of the PII classification labels of each PII data object read within the established process.

13. The data access control method of claim 12, further comprising employing the CPL list when determining whether to allow the user of the established process to access another PII data object when the particular function is a write operation to the another PII data object, wherein the another PII data object may have a different PII classification label than the PII classification label associated with the PII data object from which the information was read, thereby reclassifying the information that was read.

14. The data access control method of claim 13, further comprising providing a "reclassification allowed" parameter associated with the at least one PII PSFS, wherein if the "reclassification allowed" parameter is set, the parameter is associated with all functions defined within the corresponding at least one PII PSFS, and the parameter allows the user executing one of these functions to reclassify a PII data object when writing information into the PII data object that has a PII classification label that is not identical to or a proper subset of each of the PII classification labels contained in the CPL list.

15. The data access control method of claim 6, wherein said determining (iii) further comprises determining whether a current process label (CPL) has been set for the established process if the selected data object is other than a PII data object, and if not, rendering an access decision to the selected data object via discretionary access control checking.

16. The data access control method of claim 15, wherein said determining (iii) further comprises determining whether the particular function is a read operation if the CPL has been previously set for the process and the selected data object is other than a PII data object, and if so, then rendering an access decision to the selected data object via discretionary access control checking, and if the particular function is other than a read operation, denying access to the selected data object from the established process.

17. A system for implementing a data access control facility, said system comprising:
  means for assigning personally identifying information (PII) classification labels to PII data objects, wherein a PII data object has one PII classification label assigned thereto;
  means for defining at least one PII purpose serving function set (PSFS) comprising a list of application functions that read or write PII data objects;
  means for assigning a PII classification label to each PSFS, wherein a PII data object is only read accessible via an application function of a PII PSFS having a PII classification label that is equal to or a proper subset of the PII classification label of the PII data object;
  wherein a PII data object is write accessible by an application function of a PII PSFS having a PII classification label that is equal to or dominant of the PII classification label of the PII data object; and
  wherein the PII data object may be write accessible by an application function of a PII PSFS having a list of PII reclassifications which are allowed to that PII PSFS.

18. The system of claim 17, further comprising means for identifying a user invoking a particular function of the data access control facility, and for assigning a PII clearance set to the identified user, wherein the PII clearance set comprises a list of one or more PII classification labels for the identified user.

19. The system of claim 17, wherein the PII classification label assigned to the PII data object includes an identification of an owner of the PII data object.

20. The system of claim 17, wherein the PII classification label assigned to the PII data object includes an indication of at least one purpose for which the data object may be used.

21. The system of claim 17, further comprising initially defining PII purposes within an enterprise to use the data access control facility, and employing the PII purposes in defining the PII classification labels assigned to the PII data objects and assigned to the at least one PSFS.

22. A data access control facility comprising:
  (i) means for invoking, by a user of a data access control facility, a particular function, said data access control facility having personally identifying information (PII) classification labels assigned to PII data objects and at least one PII purpose serving function set (PSFS) including a list of application functions that read, write or reclassify PII data objects, and having a PII classification label assigned thereto, and wherein the user of the data access control facility has assigned thereto a PII clearance set, the PII clearance set for the user comprising a list containing at least one PII classification label;
  (ii) means for determining whether the particular function is defined to a PII PSFS of the at least one PII PSFS of the data access control facility, and if so, determining whether the user's PII clearance set includes a PII classification label matching the PII classification label assigned to that PII PSFS, and if so, allowing access to the particular function;
  (iii) means for determining whether the user is permitted access to a selected data object to perform the particular function;
  further comprising, prior to said invoking, means for establishing a process within an operating system under security control of the data access control facility, and wherein said invoking occurs within said established process; and
  wherein said means for determining (iii) further comprises means for determining whether a current process label (CPL) has been set for the established process if the selected data object is other than a PII data object, and if not, for rendering an access decision to the selected data object via discretionary access control checking.

23. The data access control facility of claim 22, wherein said means for determining (ii) further comprises means for denying access to the particular function if the particular function is not defined to a PII PSFS of the data access control facility, and a current process label (CPL) has been previously set for the established process.

24. The data access control facility of claim 22, wherein said means for determining (iii) comprises means for determining whether the selected data object comprises a PII data object, and if so, for verifying that the user's particular function is defined to a PII PSFS of the at least one PII PSFS of the data access control facility, and if not, for denying access to the selected data object.

25. The data access control facility of claim 24, wherein said means for determining (iii) further comprises means for determining whether the particular function comprises a read operation, and if so, for determining whether the PII classification label assigned to the PII PSFS to which the particular function is defined is equal to or a proper subset of a PII classification label associated with the selected data object, and if not, for denying access to the selected data object, and if so, for adding the PII classification label of the selected data object to a current process label (CPL) list for the established process.

26. The data access control facility of claim 24, wherein said means for determining (iii) further comprises means for determining that the particular function is other than a read operation, and when so, for determining whether a current process label (CPL) list for the established process exists, and if not, for allowing an access decision to the selected data object to proceed via discretionary access control checking.

27. The data access control facility of claim 26 wherein if the CPL list for the established process exists, means for determining whether the PII classification label of the selected data object is equal to or a proper subset of each of the CPL entries, and if so, for allowing an access decision to the selected data object to proceed via discretionary access control checking.

28. The data access control facility of claim 27, wherein if the PII classification of the PII data object is not equal to or a proper subset of the PII classification label of each CPL list entry, then the facility further comprises means for determining whether the PII PSFS to which the particular function is defined allows reclassification from the PII classification label(s) in the CPL list to the PII classification label of the PII data object, and if so, for allowing an access decision to the selected data object to proceed via discretionary access control checking, otherwise, for denying the user access to the PII data object.

29. The data access control facility of claim 24, further comprising means for providing a current process label (CPL) list for the established process, the CPL list comprising a dynamic list of the PII classification labels of each PII data object read within the established process.

30. The data access control facility of claim 29, further comprising means for employing the CPL list when determining whether to allow the user of the established process to access another PII data object when the particular function is a write operation to the another PII data object, wherein the another PII data object may have a different PII classification label than the PII classification label associated with the PII data object from which the information was read, thereby reclassifying the information that was read.

31. The data access control facility of claim 30, further comprising means for providing a "reclassification allowed" parameter associated with the at least one PII PSFS, wherein if the "reclassification allowed" parameter is set, the parameter is associated with all functions defined within the corresponding at least one PII PSFS, and the parameter allows the user executing one of these functions to reclassify a PII data object when writing information into the PII data object that has a PII classification label that is not identical to or a proper subset of each of the PII classification labels contained in the CPL list.

32. The data access control facility of claim 22, wherein said means for determining (iii) further comprises means for determining whether the particular function is a read operation if the CPL has been previously set for the process and the selected data object is other than a PII data object, and if so, then for rendering an access decision to the selected data object via discretionary access control checking, and if the particular function is other than a read operation, for denying access to the selected data object from the established process.

33. At least one program storage device readable by a machine, embodying at least one program of instructions executable by the machine to perform a method of implementing a data access control facility, said method comprising:

assigning personally identifying information (PII) classification labels to PII data objects, wherein a PII data object has one PII classification label assigned thereto;

defining at least one PII purpose serving function set (PSFS) comprising a list of application functions that read or write PII data objects;

assigning a PII classification label to each PSFS, wherein a PII data object is only read accessible via an application function of a PII PSFS having a PII classification label that is equal to or a proper subset of the PII classification label of the PII data object;

wherein a PII data object is write accessible by an application function of a PII PSFS having a PII classification label that is equal to or dominant of the PII classification label of the PII data object; and wherein the PII data object may be write accessible by an application function of a PII PSFS having a list of PII reclassifications which are allowed to that PII PSFS.

34. The at least one program storage device of claim 33, further comprising identifying a user invoking a particular function of the data access control facility, and assigning a PII clearance set to the identified user, wherein the PII clearance set comprises a list of one or more PII classification labels for the identified user.

35. The at least one program storage device of claim 33, wherein the PII classification label assigned to the PII data object includes an identification of an owner of the PII data object.

36. The at least one program storage device of claim 33, wherein the PII classification label assigned to the PII data object includes an indication of at least one purpose for which the data object may be used.

37. The at least one program storage device of claim 33, further comprising initially defining PII purposes within an enterprise to use the data access control facility, and employing the PII purposes in defining the PII classification labels assigned to the PII data objects and assigned to the at least one PSFS.

38. At least one program storage device readable by a machine, embodying at least one program of instructions executable by the machine to perform a method for controlling data access, said method comprising:

(i) invoking, by a user of a data access control facility, a particular function, said data access control facility having personally identifying information (PII) classification labels assigned to PII data objects and at least one PII purpose serving function set (PSFS) including a list of application functions that read, write or reclassify PII data objects, and having a PII classification label assigned thereto, and wherein the user of the data access control facility has assigned thereto a PII clearance set, the PII clearance set for the user comprising a list containing at least one PII classification label;

(ii) determining whether the particular function is defined to a PII PSFS of the at least one PII PSFS of the data access control facility, and if so, determining whether the user's PII clearance set includes a PII classification label matching the PII classification label assigned to that PII PSFS, and if so, allowing access to the particular function;

(iii) determining whether the user is permitted access to a selected data object to perform the particular function;

further comprising, prior to said invoking, establishing a process within an operating system under security control of the data access control facility, and wherein said invoking occurs within said established process; and wherein said determining (ii) further comprises denying access to the particular function if the particular function is not defined to a PII PSFS of the data access control facility, and a current process label (CPU has been previously set for the established process.

39. The at least one program storage device of claim 38, wherein said determining (iii) comprises determining whether the selected data object comprises a PII data object, and if so, verifying that the user's particular function is defined to a PII PSFS of the at least one PII PSFS of the data access control facility, and if not, denying access to the selected data object.

40. The at least one program storage device of claim 39, wherein said determining (iii) further comprises determining whether the particular function comprises a read operation, and if so, determining whether the PII classification label assigned to the PII PSFS to which the particular function is defined is equal to or a proper subset of a PII classification label associated with the selected data object, and if not, denying access to the selected data object, and if so, adding the PII classification label of the selected data object to a current process label (CPL) list for the established process.

41. The at least one program storage device of claim 39, wherein said determining (iii) further comprises determining that the particular function is other than a read operation, and when so, determining whether a current process label (CPL) list for the established process exists, and if not, allowing an access decision to the selected data object to proceed via discretionary access control checking.

42. The at least one program storage device of claim 41, wherein if the CPL list for the established process exists, determining whether the PII classification label of the selected data object is equal to or a proper subset of each of the CPL entries, and if so, allowing an access decision to the selected data object to proceed via discretionary access control checking.

43. The at least one program storage device of claim 42, wherein if the PII classification of the PII data object is not equal to or a proper subset of the PII classification label of each CPL list entry, then the method further comprises determining whether the PII PSFS to which the particular function is defined allows reclassification from the PII classification label(s) in the CPL list to the PII classification label of the PII data object, and if so, allowing an access decision to the selected data object to proceed via discretionary access control checking, otherwise, denying the user access to the PII data object.

44. The at least one program storage device of claim 39, further comprising providing a current process label (CPL) list for the established process, the CPL list comprising a dynamic list of the PII classification labels of each PII data object read within the established process.

45. The at least one program storage device of claim 44, further comprising employing the CPL list when determining whether to allow the user of the established process to access another PII data object when the particular function is a write operation to the another PII data object, wherein the another PII data object may have a different PII classification label than the PII classification label associated with the PII data object from which the information was read, thereby reclassifying the information that was read.

46. The at least one program storage device of claim 45, further comprising providing a "reclassification allowed" parameter associated with the at least one PII PSFS, wherein if the "reclassification allowed" parameter is set, the parameter is associated with all functions defined within the corresponding at least one PII PSFS, and the parameter allows the user executing one of these functions to reclassify a PII data object when writing information into the PII data object that has a PII classification label that is not identical to or a proper subset of each of the PII classification labels contained in the CPL list.

47. The at least one program storage device of claim 38, wherein said determining (iii) further comprises determining whether a current process label (CPL) has been set for the established process if the selected data object is other than a PII data object, and if not, rendering an access decision to the selected data object via discretionary access control checking.

48. The at least one program storage device of claim 47, wherein said determining (iii) further comprises determining whether the particular function is a read operation if the CPL has been previously set for the process and the selected data object is other than a PII data object, and if so, then rendering an access decision to the selected data object via discretionary access control checking, and if the particular function is other than a read operation, denying access to the selected data object from the established process.

* * * * *